| United States Patent [19] | [11] Patent Number: 4,996,265 |
|---|---|
| Okubo et al. | [45] Date of Patent: Feb. 26, 1991 |

[54] PROCESS FOR PREPARATION OF MONODISPERSE POLYMER PARTICLES HAVING INCREASED PARTICLE SIZE

[75] Inventors: Masayoshi Okubo, Kobe; Masami Tsujihiro, Osaka, both of Japan

[73] Assignee: Mita Industrial Co., Ltd., Osaka, Japan

[21] Appl. No.: 301,103

[22] Filed: Jan. 25, 1989

[30] Foreign Application Priority Data

Jan. 29, 1988 [JP] Japan ................................. 63-17321

[51] Int. Cl.$^5$ .............................................. C08F 2/00
[52] U.S. Cl. .................................... 525/242; 525/309; 526/71; 528/499; 524/533
[58] Field of Search ................... 525/242, 309; 526/71; 528/499; 524/533

[56] References Cited

PUBLICATIONS

Ugelstad et al., "Preparation and Application of Monodisperse Polymer Particles", Journal of Polymer Science, Polymer Symposium 72, 225–240 (1985).

Flory, Paul J., "Principles of Polymer Chemistry", Cornell University Press, Ithaca, N. Y., 1953, pp. 541, 542 and 577.

*Primary Examiner*—John C. Bleutge
*Assistant Examiner*—Vasu S. Jagannathan
*Attorney, Agent, or Firm*—Sherman and Shalloway

[57] ABSTRACT

In a dispersion system comprising seed polymer particles and a monomer, the solubility of the monomer is reduced by such means as addition of water, whereby the monomer is precipitated and absorbed in the seed polymer particles, and in this state, the monomer absorbed in the seed polymer particles is selectively polymerized.

Namely, according to the present invention, the decrease of the solubility of the monomer in the dispersion system is utilized for absorption of the monomer in the seed polymer particles, and polymer particles having an increased particle size can be prepared in a short time at a high efficiency.

18 Claims, 1 Drawing Sheet

PROCESS FOR PREPARATION OF MONODISPERSE POLYMER PARTICLES HAVING INCREASED PARTICLE SIZE

BACKGROUND OF THE INVENTION

(1) Field of the Invention

The present invention relates to a process for the preparation of monodisperse polymer particles having an increased particle size. More particularly, the present invention relates to a process in which the solubility of a monomer present in a dispersion medium of seed polymer particles is reduced to make the monomer absorbed in the seed polymer particles and polymerization is carried out in this state, whereby polymer particles having an increased particle size are prepared.

(2) Description of the Related Art

The emulsion polymerization process, the suspension polymerization process and the dispersion polymerization process are known as the process for the preparation of spherical polymer particles. Each of these processes is characterized by the particle size, particle size distribution and molecular weight of the obtained polymer. In the emulsion polymerization process, monodisperse fine particles of a high polymer can be obtained, but only particles having a particle size smaller than 1.0 $\mu$m are obtained. In contrast, in the suspension polymerization process, particles having a particle size larger than 10 $\mu$m can be obtained, but a product other than a product having a polydisperse particle size distribution cannot be synthesized. In connection with the dispersion polymerization, the synthesis of monodisperse particles having a particle size of about 7 $\mu$m has been reported, but it is impossible to control the molecular weight of the polymer constituting the particles and the particle size, and kinds of monomers that can be used are limited.

As the means for overcoming these defects, there has been proposed the so-called two-staged swelling process in which monodisperse particles synthesized by the emulsion polymerization are swollen by an oligomer or solvent and then swollen by a monomer and then, polymerization is carried out, as disclosed in Journal of Polymer Science, Polymer Symposium, 72, 225–240, (1985).

This known process, however, is defective in that the complicated means, that is, the two-staged swelling, is necessary, a long time is required for the swelling operation, and the productivity is low.

If spherical polymer particles having a particle size of several $\mu$m to scores of $\mu$m and a monodisperse particle size distribution are obtained, since the particle size distribution is sharp and such an operation as classification is not necessary, it is expected that they will be used as electrophotographic toners, gap-adjusting agents for liquid crystal display panels, standard particles of a Coulter counter, column fillers for the chromatography or the like, carriers for immune diagnosis agents, cosmetic fillers and the like.

SUMMARY OF THE INVENTION

It is therefore a primary object of the present invention to provide a process in which monodisperse polymer particles having an increased particle size can be produced at a high productivity.

Another object of the present invention is to provide a process in which decrease of the solubility of a monomer in a dispersion medium is utilized for absorption of the monomer in seed polymer particles and monodisperse polymer particles having a large particle size can be prepared in a short time at a high efficiency.

More specifically, in accordance with the present invention, there is provided a process for the preparation of monodisperse polymer particles having an increased particle size, which comprises dissolving or dispersing a monomer, seed polymer particles having a swelling property to the monomer, a dispersion stabilizer and an oil-soluble polymerization initiator in a water-miscible organic solvent capable of dissolving the monomer therein but incapable of dissolving a polymer of the monomer therein or a liquid mixture of said water-miscible organic solvent and water, causing the monomer and polymerization initiator to be absorbed in the seed polymer particles by adopting means of reducing the solubility of the monomer, and selectively polymerizing the monomer absorbed in the seed polymer particles.

In the present invention, a water-miscible organic solvent capable of dissolving a monomer but incapable of dissolving a polymer of the monomer or a liquid mixture of the water-miscible organic solvent and water is used as the solvent for dissolving the monomer and also as the dispersion medium for dispersing seed polymer particles. Namely, in the solvent and dispersion medium used in the present invention, decrease of the monomer-dissolving power by addition of water is conspicuous, and the monomer is forcibly absorbed in the seed polymer particles in an amount corresponding to the degree of this decrease of the monomer-dissolving power, with the result that the polymer particles are swollen. Of course, in order to effect this forcible swelling of the polymer particles, it is indispensable that the seed polymer particles should have a swelling property to the monomer. Furthermore, it is important that the seed polymer particles should be present in the form of stable and independent dispersed particles in the polymerization system, and for this purpose, a dispersion stabilizer should be present in the polymerization system. Moreover, initiation of the polymerization should be selectively effected only on the monomer absorbed in the seed polymer particles. If the polymerization is initiated in the monomer dissolved in the dispersion medium, the monomer is absorbed in polymer particles formed by this polymerization and the growth of particles is caused, and monodisperse polymer particles can hardly be obtained. Accordingly, it is preferred that the polymerization initiator be oil-soluble and be absorbed in the seed polymer particles as well as the monomer.

In the process of the present invention, as pointed out hereinbefore, by utilizing the decrease of the solubility of the monomer in the solvent and dispersion medium as the driving force, swelling of the seed polymer particles by the monomer is forcibly effected.

Addition of water is simplest and most efficient as the means for decreasing the solubility of the monomer, but the means is not limited to addition of water and it must be understood that there can be adopted, for example, means of evaporating the water-miscible organic solvent to decrease the concentration thereof in the system and means of lowering the temperature of the dispersion medium, independently or in combination. At this step, the solubility-decreasing effect can be promoted by addition of an electrolyte such as sodium chloride to the system. Furthermore, there can be adopted a method in which a hydroxide and a strong acid are added to the dispersion system to simultaneously effect supply of water and addition of an electrolyte. Furthermore, it must be noted that in the liquid mixture of the water-miscible organic solvent and water, the decrease of the solubility of the monomer by reduction of the temperature is more conspicuous than in other systems.

In the present invention, in the case where the solubility of the monomer is effected by addition of water, there can be adopted a method in which the dispersion system is contacted with water through a semipermeable membrane.

According to this method, by dint of the difference of the osmotic pressure, water passes through the semipermeable membrane relatively uniformly and is introduced into the dispersion medium, and simultaneously, the organic solvent in the dispersion system is discharged from the system.

Discharge of the organic solvent from the system is especially effective for decreasing the amount of the monomer dissolved in the solvent and preventing formation of particles having a small particle size by homopolymerization of the monomer.

In view of the above-mentioned function, it is preferred that a semipermeable membrane allowing water and the organic solvent to pass therethrough but not allowing the seed polymer, the monomer and the polymerization initiator to pass there through be used. However, a semipermeable membrane allowing the monomer or polymerization initiator to pass therethrough, such as cellophane, can be sufficiently used. The reason is considered to be that the speed of intrusion of water into the system is higher than the speed of diffusion of the polymerization initiator or monomer and therefore, reduction of the solubility of the monomer and polymerization initiator and absorption in the seed polymer are rapidly effected. Furthermore, there can be adopted a method in which in order to prevent diffusion of the monomer or polymerization initiator through the membrane, a pressure is applied to the water side to forcibly introduce water into the dispersion system.

Of course, this means of decreasing the solubility of the monomer by using a semipermeable membrane can be adopted in combination with the above-mentioned other means of adding an electrolyte such as sodium chloride to the dispersion system or lowering the temperature of the dispersion system, whereby the solubility-decreasing effect is promoted.

In the present invention, in the case where the solubility of the monomer is decreased by addition of water, instead of the above-mentioned means of contacting the dispersion system with water through a semipermeable membrane, there can be adopted the following water-supplying and organic solvent-discharging methods in which the solubility of the monomer is decreased uniformly throughout the dispersion system without local increase of the concentration of water.

For example, there can be mentioned a method in which water is contained in microcapsules composed of a polymer which is not dissolved in the organic solvent and water of the dispersion system and allow permeation of the solvent, such as a polyamide or a polyester, and the microcapsules are added to the dispersion system, a method in which a water-absorbing polymer composed of a slightly crosslinked water-soluble polymer, for example, starch crosslinked with a polyacrylic acid salt, is swollen with water and added to the system, a method in which an organic solvent-absorbing polymer obtained by slightly crosslinking a polymer soluble in the water-miscible organic solvent but insoluble in water, such as polyallyl alcohol or polyvinyl alcohol, is added to the dispersion system and the water-miscible organic solvent is absorbed, a method in which air containing water under such a water vapor pressure as forming water by condensation at a temperature lower than the temperature of the dispersion system is brought into contact with the dispersion system and the concentration of water in the dispersion system is increased by water formed by condensation, and a method in which the dispersion system is cooled to about 0° C., fine ice pieces are added to the system and ice is molten by heating with stirring to effect supply of water.

As pointed out hereinbefore, according to the customary process, it is very difficult to swell polymer particles by making a large quantity of a monomer absorbed in the polymer particles in a short time. In contrast, according to the process of the present invention, by utilizing decrease of the solubility of a monomer in a specific solvent and dispersion medium, the monomer is precipitated and absorbed in a seed polymer, whereby the swelling treatment of seed polymer particles can be accomplished in short time at a high efficiency. Furthermore, since selective polymerization of the monomer absorbed in the seed polymer particles is possible, the particle size is increased, and spherical polymer particles having monodisperse particle size distribution can be obtained.

DETAILED DESCRIPTION OF THE PREFERRED EMBODIMENTS

Monomer

The monomer used in the present invention is an ethylenically unsaturated monomer having a radical polymerizability. As preferred examples, there can be mentioned monovinyl aromatic monomers, acrylic monomers, vinyl ester monomers, vinyl ether monomers, diolefin monomers, mono-olefin monomers, halogenated olefin monomers and polyvinyl monomers.

As the monovinyl aromatic polymer, there can be mentioned monovinyl aromatic hydrocarbons represented by the following formula:

(1)

wherein $R_1$ stands for a hydrogen atom, a lower alkyl group or a halogen atom, and $R_2$ stands for a hydrogen atom, a lower alkyl group, a halogen atom, an alkoxy group, and amino group, a nitro group, a vinyl group or a carboxyl group, such as styrene, α-methylstyrene, vinyltoluene, α-chlorostyrene, o-chlorostyrene, m-chlorostyrene, p-chlorostyrene, p-ethylstyrene, sodium styrene-sulfonate and divinylbenzene. These monomers can be used singly or in the form of mixtures of two or more of them.

Furthermore, there can be mentioned acrylic monomers represented by the following formula:

$$CH_2=\underset{\underset{R_3}{|}}{C}-CO-O-R_4 \quad (2)$$

wherein $R_3$ stands for a hydrogen atom or a lower alkyl and $R_4$ stands for a hydrogen atom, a hydrocarbon group having up to 12 carbon atoms, a hydroxyalkyl group, a vinyl ester group or an aminoalkyl group, such as acrylic acid, methacrylic acid, methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, butyl γ-hydroxyacrylate, butyl δ-hydroxyacrylate, ethyl β-hydroxymethacrylate, propyl γ-aminoacrylate, propyl γ-N,N-diethylaminoacrylate, ethylene glycol dimethacrylate and tetraethylene glycol dimethacrylate, vinyl esters represented by the following formula:

$$CH_2=\underset{\underset{\underset{O}{\|}}{\underset{O-C-R_5}{|}}}{CH} \quad (3)$$

wherein $R_5$ stands for a hydrogen atom or a lower alkyl group,
such as vinyl formate, vinyl acetate and vinyl propionate, vinyl ethers represented by the following formula:

$$CH_2=\underset{\underset{O-R_6}{|}}{CH} \quad (4)$$

wherein $R_6$ stands for a monovalent hydrocarbon group having up to 12 carbon atoms,
such as vinylmethyl ether, vinylethyl ether, vinyl-n-butyl ether, vinylphenyl ether and vinylcyclohexyl ether, diolefins represented by the following formula:

$$CH_2=\underset{\underset{R_7}{|}}{C}-\underset{\underset{R_8}{|}}{C}=CH-R_9 \quad (5)$$

wherein $R_7$, $R_8$ and $R_9$ stand for a hydrogen atom, a lower alkyl group or a halogen atom, such as butadiene, isoprene and chloroprene, monoolefins represented by the following formula:

$$CH_2=\underset{\underset{R_{10}}{|}}{C}-R_{11} \quad (6)$$

wherein $R_{10}$ and $R_{11}$ stand for a hydrogen atom or a lower alkyl group,
such as ethylene, propylene, isoprene, butene-1, pentene-1 and 4-methylpentene-1, halogenated olefin monomers such as vinyl chloride and vinylidene chloride, and polyvinyl monomers such as divinylbenzene, diallyl phthalate and triallyl phthalate.

These monomers can be used singly or in the form of mixtures of two or more of them. As preferred examples, there can be mentioned styrene, an acrylic acid ester, a methacrylic acid ester, a mixture of styrene and an acrylic acid ester, a mixture of styrene and a methacrylic acid ester, and a mixture of styrene and divinyl benzene.

Organic Solvent

As the water-miscible solvent, there can be mentioned lower alcohols such as methanol, ethanol and isopropanol, polyhydric alcohols such as ethylene glycol, propylene glycol, butane-diol, diethylene glycol and triethylene glycol, cellosolves such as methyl cellosolve and ethyl cellosolve, ketones such as acetone and methylethyl ketone, ethers such as tetrahydrofuran, and esters such as ethyl acetate. A solvent capable of dissolving the monomer therein but incapable of dissolving a polymer thereof is selected and used in combination with monomer. As the solvent having a high monomer-dissolving power, which can be mixed with water at an optional ratio and therefore, can be used valuably for attaining the objects of the present invention, there can be mentioned lower alcohols such as ethanol.

The water-miscible organic solvent can be used singly or in the form of a liquid mixture with water. In case of the liquid mixture, it is preferred that water be contained in an amount as large as possible, so far as the solubility of the monomer is not practically reduced, and the mixing ratio is determined according to the monomer and organic solvent used. For example, if a lower alcohol is used as the organic solvent, the organic solvent and water can be used at a volume ratio of from 10/1 to 3/5, especially from 4/3 to 3/4.

Seed Polymer Particles

The seed polymer particles used in the present invention have a swelling property to the above-mentioned monomer, and the seed polymer particles are polymer particles obtained by polymerizing at least one member selected from the above-mentioned monomers. In general, the polymer particles are formed of the same monomer as the monomer to be polymerized, but the polymer particles may be formed of a monomer different from the monomer to be polymerized. As an example of the former case, there can be mentioned a combination of styrene type polymer particles and a styrene type monomer, and as an example of the latter case, there can be mentioned a combination of acrylic polymer particles and a styrene type monomer.

The seed polymer particles have a monodisperse particle size distribution, and it is preferred that the particle size be 0.01 to 50 μm, especially 0.5 to 20 μm. The seed polymer particles can be easily obtained by the known dispersion process or emulsion polymerization process, or by pulverizing a polymer and classifying the pulverization product.

Dispersion Stabilizer

As the dispersion stabilizer for improving the dispersibility of the seed polymer particles in the solvent and dispersion medium, there can be used known polymeric dispersion stabilizers such as polyvinyl alcohol, methyl cellulose, ethyl cellulose, polyacrylic acid, polyacrylamide, polyethylene oxide and poly(hydroxystearic acid-methyl g-methacrylate-co-methacrylic acid) copolymer and nonionic surface active agents, anionic suface active agents, cationic surface active agents and amphoteric surface active agents.

Among them, a polymeric dispersion stabilizer such as polyvinyl alcohol is preferred, and good results can be obtained by using this polymeric dispersion stabilizer together with an organic solvent-water liquid mixture.

Polymerization Initiator

Any of oil-soluble polymerization initiators can be used. For example, radical polymerization initiators soluble in the monomer, such as azo compounds, e.g., azobisisobutyronitrile, and peroxides, e.g., cumene hydroperoxide, t-butyl hydroperoxide, dicumyl peroxide, di-t-butyl peroxide, benzoyl peroxide and lauroyl peroxide. In case of polymerization by ultraviolet rays, an oil-soluble photopolymerization initiator is selected among known photopolymerization initiators.

Preparation of Dispersion System

According to the present invention, the monomer is dissolved in the water-miscible organic solvent or its mixture with water. The amount dissolved of the monomer differs greatly according to the kinds and composition of the solvent and monomer, but it is preferred that the amount dissolved of the monomer be 0.01 to 50% by weight, especially 1 to 20% by weight.

The seed polymer particles, the dispersion stabilizer and the polymerization initiator are added to the so-formed solution to obtain the dispersion system.

The amount added of the seed polymer particles is changed according to the degree of increase of the particle size, but it is preferred that the seed polymer particles and monomer be present in the dispersion system at a ratio of from $1/1$ to $1/10^9$, especially from $1/10$ to $1/10^6$, and it also is preferred that the concentration of the seed polymer particles in the dispersion system be 0.0001 to 50% by weight, especially 0.01 to 20% by weight. In the case where it is intended to prepare polymer particles having a particle size n times as large as the particle size of the seed polymer particles, it is ordinarily necessary to use the monomer in an amount (weight) $n^3$ times as large as the amount of the seed polymer particles.

It is preferred that the dispersion stabilizer be used in an amount of 0.1 to 30% by weight, especially 1 to 10% by weight, based on the seed polymer particles, and that the polymerization initiator be used in an amount of 0.001 to 10% by weight, especially 0.01 to 0.5% by weight, based on the charged monomer.

Means for Decreasing Solubility of Monomer

According to the process of the present invention, the solubility of the monomer is decreased by such means as addition of water to the dispersion system, evaporation of the solvent and lowering of the temperature of the dispersion system, whereby the monomer is precipitated and absorbed in the seed polymer particles.

It is preferred that at least 50% by weight, especially at least 90% by weight, of the charged monomer be absorbed in the seed polymer particles. By adding water to the dispersion medium and, optionally, lowering the temperature of the dispersion system, all of the charged monomer can be substantially precipitated and absorbed in the seed polymer particles. The present invention is prominently characterized in that this treatment can be accomplished in a very short time, and absorption of the polymerization initiator can be accomplished simultaneously with absorption of the monomer.

In the present invention, contact of the dispersion system with water through a semipermeable membrane can be effectively adopted as means for adding water to the dispersion system.

As the semipermeable membrane, there can be optionally used dialysis membranes such as a cellophane membrane, a collodion membrane, a parchment paper membrane, a cellulose membrane, a cellulose derivative membrane, an acrylonitrile/sodium methacrylsulfonate copolymer membrane, a polycarbonate/polyether block copolymer membrane and an ethylene/vinyl alcohol copolymer membrane, reverse osmosis membranes such as cellulose acetate type membranes, e.g., a cellulose acetate membrane and a cellulose acetate sulfate membrane, polyamide type membranes, e.g., a polyamidehydrazide membrane, a polypiperazineamide membrane and an m-phenyl isophthalamide-/terephthalamide copolymer membrane, polyethyleneimine type membranes, polyethylene oxide type membranes and Vyron, polybenzimidazolone and polyimide membranes, and ultrafiltration membranes through which relatively small substances permeate, such as cellulose dioxide, sulfonated polybenzoxazinedione and polyamide-imide membranes.

As the means for contacting the dispersion system with water, there can be mentioned a method in which water packed in a semipermeable membrane is added to the dispersion system, a method in which water partitioned by a semipermeable membrane is added, and a method in which the dispersion system and water are simultaneously charged in a vessel partitioned by a semipermeable membrane. In order to diffuse water in the dispersion system as uniformly as possible, it is preferred that the contact area per unit volume of the dispersion system be broadened and stirring means be arranged to cause the dispersion system to flow. For example, continuous production can be efficiently performed if a tubular apparatus is partitioned by a semipermeable membrane and the dispersion system is contacted with water convectively.

Polymerization

The monomer absorbed in the seed polymer particles is polymerized. The polymerization is generally carried out in an inert atmosphere such as nitrogen at a temperature of $-30°$ to $90°$ C., preferably $30°$ to $80°$ C. The polymerization time is determined so that the polymerization of the monomer is completed, and it is generally preferred that the polymerization time be 0.1 to 30 hours. In the process of the present invention, the polymerization may be conducted in one stage, or the polymerization may be conducted in a plurality of stages so that the particles grow to a predetermined particle size. The formed polymer is characterized in that the particle size is 1 to 1000 $\mu m$, especially 5 to 100 $\mu m$, and the polymer has a highly monodisperse particle size distribution. The obtained polymer particles can be used in the form of a suspension in various fields, or the formed polymer particles can be recovered by filtration, washed with water according to need and used in the powdery form in various fields.

The present invention will now be described in detail with reference to the following examples that by no means limit the scope of the invention.

EXAMPLE 1

A mixed solution comprising 20 ml of styrene, 36 ml of deionized water, 144 ml of ethanol, 284 mg of azobisisobutyronitrile and 2 g of polyacrylic acid was charged in a three-neck separable flask equipped with a reflux condenser, and reaction was carried out at 70° C. for 12 hours in a nitrogen current with stirring at 100 rpm to obtain a seed polymer. When the obtained seed polymer was observed by an optical microscope, it was confirmed that the seed polymer was composed of monodisperse particles having a particle size of about 2 μm.

An emulsion was obtained by dispersing 0.4 g of the obtained seed polymer particles in a solution comprising 70 g of ethanol, 70 g of deionized water, 3 g of styrene, 0.15 g of polyvinyl alcohol and 0.15 g of 2,2'-azobis(2,4-dimethyl-valeronitrile).

The obtained emulsion was rapidly cooled to −10° C. from room temperature (about 20° C.) at a rate of 2° C./min. The emulsion in this state was observed by an optical microscope. It was confirmed that the particles were swollen to spherical particles having a particle size of about 8 μm. Then, 100 g of deionized water maintained at 0° C. was added at a time to the emulsion cooled to −10° C., and the mixture was charged in a three-neck flask equipped with a reflux condenser and the reaction was carried out at 70° C. for 8 hours in a nitrogen current with stirring at 100 rpm to complete polymerization.

The polymer obtained by the above reaction was recovered by filtration and dried to obtain 3 g of resin fine particles. The filtrate was substantially transparent. When the particle size distribution was measured by a Coulter counter, the results shown in Table 1 were obtained. As is seen from the results shown in Table 1, the obtained polymer had a highly monodisperse particle size distribution and was composed of spherical particles having an average particle size of 7.8 μm.

TABLE 1

| Average Particle Size (μm) | 7.8 |
|---|---|
| Particle Size Distribution (%) | |
| below 6.3 μm | 1 |
| 6.3 to 8.0 μm | 92 |
| above 8.0 μm | 7 |

EXAMPLE 2

By using the seed polymer particles prepared in Example 1, an emulsion was prepared in the same manner as described in Example 1 except that 2,2'-azobis(4-methoxy-2,4-dimethylvaleronitrile) was used as the polymerization initiator.

Then, 20 g of deionized water was dropped at a rate of 0.5 g/min to the emulsion being violently stirred, and 80 g of deionized water was further added. When the emulsion was observed by an optical microscope, it was found that the particles were swollen to spherical particles having a particle size of about 8 μm.

The emulsion was charged in a three-neck flask equipped with a reflux condenser, and the reaction was carried out at 70° C. for 18 hours in a nitrogen current with stirring at 100 rpm to complete polymerization. The obtained polymer was recovered by filtration and dried to obtain 2.8 g of resin fine particles. When the particle size distribution was measured by a Coulter counter, results shown in Table 2 were obtained. As is seen from the results shown in Table 2, the obtained polymer had a highly monodisperse particle size distribution and was composed of spherical particles having an average particle size of 7.6 μm.

TABLE 2

| Average Particle Size (μm) | 7.6 |
|---|---|
| Particle Size Distribution (%) | |
| below 6.3 μm | 2 |
| 6.3 to 8.0 μm | 88 |
| above 8.0 μm | 10 |

EXAMPLE 3

A mixed solution comprising 14 ml of styrene, 6 ml of butyl acrylate, 36 ml of deionized water, 144 ml of ethanol, 280 mg of azobisisobutyronitrile and 2 g of polyacrylic acid was charged in a three-neck separable flask equipped with a reflux condenser, and reaction was carried out at 70° C. for 12 hours in a nitrogen current with stirring at 100 rpm to obtain a seed polymer. When the obtained seed polymer was observed by an optical microscope, it was confirmed that the seed polymer was composed of monodisperse particles having a particle size of about 2 μm.

An emulsion was obtained by dispersing 0.4 g of the obtained seed polymer particles in a solution comprising 70 g of ethanol, 70 g of deionized water, 20 g of styrene, 0.3 g of polyvinyl alcohol and 0.15 g of benzoyl peroxide.

When, 30% of the medium in the obtained emulsion was evaporated by reducing the pressure to 400 mmHg at 30° C. By this operation, the evaporation of a small amount of styrene was caused, and with decrease of the concentration of methanol, the particles were swollen to spherical particles having a particles size of about 14 μm.

Then, the emulsion was charged in a three-neck flask equipped with a refluxing condenser and the reaction was carried out at 70° for 8 hours in a nitrogen current with stirring at 100 rpm to complete polymerization.

The polymer obtained by the above reaction was recovered by filtration and dried to obtain 16 g of resin fine particles. The filtrate was substantially transparent. When the particle size distribution was measured by a Coulter counter, results shown in Table 3 were obtained. As is seen from the results shown in Table 3, the obtained polymer had a highly monodisperse particle size distribution and was composed of spherical particles having an average particle size of 13.4 μm.

TABLE 3

| Average Particle Size (μm) | 13.4 |
|---|---|
| Particle Size Distribution (%) | |
| below 12.7 μm | 1 |
| 12.7 to 16.0 μm | 93 |
| above 16.0 μm | 6 |

EXAMPLE 4

A seed polymer was obtained in the same manner as described in Example 1 by using a mixed solution comprising 20 ml of methyl methacrylate, 36 ml of deionized water, 144 ml of isopropyl alcohol, 200 mg of 2,2'-azobisisobutyronitrile and 2 g of polyacrylic acid.

When the seed polymer was observed by an optical microscope, it was confirmed that the seed polymer was composed of monodisperse particles having a particle size of about 1 μm.

An emulsion was prepared by dispersing 0.1 g of the obtained seed polymer in a solution comprising 50 ml of isopropyl alcohol, 70 g of deionized water, 10 g of methyl methacrylate, 0.15 g of polyvinylpyrolidone and 0.15 g of benzoyl peroxide.

When the emulsion was rapidly cooled to −10° C. from room temperature in the same manner as described in Example 1, the seed polymer particles were swollen to a particle size of about 10 μm.

Then, 100 g of deionized water maintained at 0° C. was added at a time to the emulsion cooled to −10° C., and polymerization was carried out in the same manner as described in Example 1.

The obtained polymer was recovered by filtration and dried to obtain 10 g of resin particles. The filtrate was substantially transparent. When the particle size distribution of the resin particles was measured by a Coulter counter, results shown in Table 4 were obtained. As is seen from the results shown in Table 4, the obtained polymer had a highly monodisperse particle size distribution and was composed of spherical particles having an average particle size of 9.7 μm.

TABLE 4

| Average Particle Size (μm) | 9.7 |
|---|---|
| Particle Size Distribution (%) | |
| below 8.0 μm | 1 |
| 8.0 to 10.1 μm | 95 |
| above 10.1 μm | 4 |

EXAMPLE 5

An emulsion was prepared by dispersing 0.4 g of the seed polymer prepared in Example 1 in a solution comprising 30 g of ethanol, 50 g of deionized water, 3 g of methyl methacrylate, 0.15 g of lauryltrimethyl ammonium chloride and 0.15 g of 2,2'-azobis(2,4-dimethylvaleronitrile).

When the emulsion was rapidly cooled to −10° C. from room temperature in the same manner as described in Example 1, the seed polymer particles were swollen to spherical particles having a particle size of about 8 μm.

Then, 100 g of deionized water maintained at 0° C. was added at a time to the emulsion cooled to −10° C., and polymerization was carried out in the same manner as described in Example 1.

The polymer was recovered by filtration and dried to obtain 3 g of resin particles. The filtrate was slightly opaque. The particle size distribution of the obtained resin particles was measured by a Coulter counter. The obtained results are shown in Table 5. As is seen from the results shown in Table 5, the obtained polymer had a highly monodisperse particle size distribution and was composed of spherical particles having an average particle size of 7.6 μm.

TABLE 5

| Average Particle size (μm) | 7.6 |
|---|---|
| Particle Size Distribution (%) | |
| below 6.3 μm | 1 |
| 6.3 to 8.0 μm | 92 |
| above 8.0 μm | 7 |

EXAMPLE 6

An emulsion was prepared by dispersing 0.1 g of the seed polymer prepared in Example 4 in a solution comprising 40 g of isopropyl alcohol, 100 g of deionized water, 20 g of methyl acrylate, 0.15 g of polyacrylic acid and 0.15 g of 2,2'-azobisisobutyronitrile.

Then, the emulsion was rapidly cooled to −10° C. from room temperature in the same manner as described in Example 1. It was found that the seed polymer particles were swollen to a particle size of about 13 μm.

The, 100 g of deionized water maintained at 0° C. was added at a time to the emulsion cooled to −10° C., and polymerization was carried out in the same manner as described in Example 1.

The obtained polymer was recovered by filtration and dried to obtain 20 g of resin particles. The filtrate was substantially transparent. The particle size distribution was measured by a Coulter counter. The obtained results are shown in Table 6. As is seen from the results shown in Table 6, the obtained polymer had a highly monodisperse particle size distribution and was composed of spherical particles having an average particle size of 12.2 μm.

TABLE 6

| Average Particle Size (μm) | 12.2 |
|---|---|
| Particle Size Distribution (%) | |
| below 10.1 μm | 1 |
| 10.1 to 12.7 μm | 92 |
| above 12.7 μm | 7 |

EXAMPLE 7

A mixed solution comprising 150 g of styrene, 600 g of deionized water, 0.3 g of potassium persulfate and 0.3 g of polyoxyethylene sorbitol mono-oleate was charged into a three-neck flask equipped with a reflux condenser, and the reaction was carried out at 70° C. for 12 hours in a nitrogen current with stirring at 150 rpm.

When the seed polymer was observed by a transmission type electron microscope, it was found that the seed polymer was composed of monodisperse particles having a particle size of about 0.8 μm.

An emulsion was prepared by dispersing 1 mg of the obtained seed polymer particles in a solution comprising 70 g of methanol, 70 g of deionized water, 4 g of styrene, 0.2 g of lauryldimethylamine oxide and 0.15 g of cumene hydroperoxide.

Then, 0.5 g of sodium chloride was added little by little to the obtained emulsion with violent stirring, and 5 g of deionized was dropped into the emulsion at a rate of 0.5 g/min and 20 g of deionized water was further added. When the emulsion was observed by an optical microscope, it was confirmed that the particles were swollen to spherical particles having a particle size of about 12 μm.

The emulsion was charged in a separable flask equipped with a reflux condenser and the reaction was carried out at 80° C. for 8 hours in a nitrogen current with stirring at 100 rpm to complete polymerization. The formed polymer was recovered by filtration and dried to obtain 4 g of resin particles. The filtrate was substantially transparent. When the particle size distribution of the obtained resin particles was measured by a Coulter counter, results shown in Table 7 were obtained. As is seen from the results shown in Table 7, the obtained polymer had a highly monodisperse particle size distribution and was composed of spherical particles having an average particle size of 11.8 μm.

TABLE 7

| Average Particle Size (μm) | 11.8 |
|---|---|
| Particle Size Distribution (%) | |
| below 10.1 μm | 2 |
| 10.1 to 12.7 μm | 88 |
| above 12.7 μm | 10 |

EXAMPLE 8

An emulsion was prepared by dispersing 1 mg of the seed polymer particles prepared in Example 7 in a solution comprising 70 g of methanol, 70 g of deionized water, 4 g of vinyl acetate, 0.15 g of polyvinyl alcohol and 0.15 g of 2,2'-azobis(2,4-dimethylvaleronitrile).

When the emulsion was rapidly cooled to −10° C. from room temperature in the same manner as described in Example 1, it was confirmed that the seed polymer particles at −10° C. were swollen to spherical particles having a particle size of about 12 μm.

Then, 100 g of deionized water maintained at 0° C. was added at a time to the emulsion cooled to −10° C., and polymerization was carried out in the same manner as described in Example 1.

The polymer was recovered by filtration and dried to obtain 4 g of resin particles. The filtrate was substantially transparent. The particle size distribution of the obtained resin particles was measured by a Coulter counter. The obtained results are shown in Table 8. As is seen from the results shown in Table 8, the polymer had a highly monodisperse particle size distribution and was composed of spherical particles having an average particle size of 11.7 μm.

TABLE 8

| Average Particle Size (μm) | 11.7 |
|---|---|
| Particle Size Distribution (%) | |
| below 10.1 μm | 1 |
| 10.1 to 12.7 μm | 93 |
| above 12.7 μm | 6 |

EXAMPLE 9

A mixed solution comprising 90 ml of butyl acrylate, 320 ml of deionized water and 0.1 g of potassium persulfate was charged in a three-neck separable flask equipped with a reflux condenser, and the reaction was carried out at 70° C. for 24 hours in a nitrogen current with stirring at 150 rpm to obtain a seed polymer.

When the so-obtained seed polymer was observed by a transmission type electron microscope, it was confirmed that the seed polymer was composed of monodisperse particles having a particle size of about 0.6 μm.

An emulsion was prepared by dispersing 1 mg of the seed polymer particles in a solution comprising 70 g of methanol, 70 g of deionized water, 4 g of styrene, 0.2 g of polyvinyl alcohol and 0.15 g of 2,2′-azobis(2,4-dimethylvaleronitrile).

Then, 30% of the medium in the emulsion was evaporated by reducing the pressure to 400 mmHg at 30° C. By this operation, the concentration of methanol in the emulsion was reduced, and evaporation of a small amount of styrene was simultaneously caused. When the emulsion was observed by an optical microscope, it was confirmed that the seed polymer particles were swollen to spherical particles having a particle size of about 15 μm.

The emulsion was charged in a three-neck flask equipped with a reflux condenser, and the reaction was carried out at 70° C. for 8 hours in a nitrogen current with stirring at 100 rpm to complete polymerization. The formed polymer was recovered by filtration and dried to obtain 3 g of resin particles. The filtrate was substantially transparent. The particle size distribution of the resin particles was measured by a Coulter counter. The obtained results are shown in Table 9. As is seen from the results shown in Table 9, the polymer had a highly monodisperse particle size distribution and was composed of spherical particles having an average particle size of 14.8 μm.

TABLE 9

| Average Particle Size (μm) | 14.8 |
|---|---|

TABLE 9-continued

| Particle Size Distribution (%) | |
|---|---|
| below 12.7 μm | 1 |
| 12.78 to 16.0 μm | 95 |
| above 16.0 μm | 4 |

EXAMPLE 10

By using the seed polymer particles prepared in Example 7, an emulsion was prepared in the same manner as described in Example 7 except that sodium laurate and 2,2′-azobisisobutyronitrile were used instead of lauryldimethylamine oxide and cumene hydroperoxide.

The emulsion was cooled to −10° C. from room temperature (about 20° C.) at a rate of 2° C./min. When the emulsion in this state was observed by an optical microscope, it was confirmed that the particles were swollen to a particle size of about 20 μm. The emulsion was irradiated with ultraviolet rays by an ultraviolet ray lamp for 30 hours to complete polymerization.

The obtained polymer was recovered by filtration and dried to obtain 4 g of resin fine particles. The filtrate was transparent. The particle size distribution of the obtained resin particles was measured by a Coulter counter. The obtained results are shown in Table 10. As is seen from the results shown in Table 10, the polymer had a highly monodisperse particle size distribution and was composed of spherical particles having an average particle size of 19.8 μm.

TABLE 10

| Average Particle Size (μm) | 19.8 |
|---|---|
| Particle Size Distribution (%) | |
| below 20.2 μm | 1 |
| 20.2 to 25.4 μm | 95 |
| above 25.4 μm | 4 |

EXAMPLE 11

To the emulsion prepared in Example 1 and cooled to −10° C. was added at a time 50 g of deionized water maintained at 0° C., and 30 g of styrene and 50 g of ethanol were added to the emulsion and the emulsion was cooled to −10° C. at a rate of 2° C./min. When the emulsion in this state was observed by an optical microscope, it was confirmed that the emulsion was further swollen and the particles grew to a particle size of about 20 μm. Then, 50 g of deionized water maintained at 0° C. was added at a time to the emulsion and the emulsion was charged in a three-neck separable flask equipped with a reflux condenser. The reaction was carried out at 70° C. for 8 hours in a nitrogen current with stirring at 100 rpm to complete polymerization.

The obtained polymer was recovered by filtration and dried to obtain 5 g of resin particles. The filtrate was substantially transparent. The particle size distribution of the obtained resin particles was measured by a Coulter counter. The obtained results are shown in Table 11. As is seen from the results shown in Table 11, the obtained polymer had a highly monodisperse particle size distribution and was composed of spherical particles having an average particle size of 20.3 μm.

TABLE 11

| Average Particle Size (μm) | 20.3 |
|---|---|
| Particle Size Distribution (%) | |
| below 16.0 μm | 1 |
| 16.0 to 25.4 μm | 95 |

EXAMPLE 12

An emulsion was prepared by dispersing 0.4 g of the seed polymer particles prepared in Example 1 in a solution comprising 70 g of ethanol, 70 g of deionized water, 1.5 g of styrene, 1.5 g of methyl methacrylate, 0.15 g of polyvinyl alcohol, 0.2 g of benzoyl peroxide and 0.1 g of dimethylaniline.

When the emulsion was rapidly cooled to −10° C. from room temperature in the same manner as described in Example 1, it was confirmed that the seed polymer particles were swollen to spherical particles having a particle size of about 8 μm. Polymerization of the emulsion was carried out in the same manner as described in Example 1.

The polymer obtained by the above reaction was recovered by filtration and dried to obtain 3 g of resin fine particles. The filtrate was substantially transparent. The particle size distribution of the obtained particles was measured by a Coulter counter. The obtained results are shown in Table 12. As is seen from the results shown in Table 12, the obtained polymer had a highly monodisperse particle size distribution and was composed of spherical particles having an average particle size of 8.0 μm.

TABLE 12

| Average Particle Size (μm) | 8.0 |
|---|---|
| Particle Size Distribution (%) | |
| below 6.3 μm | 1 |
| 6.3 to 8.0 μm | 90 |
| above 8.0 μm | 9 |

EXAMPLE 13

A polystyrene resin was pulverized and classified to obtain resin particles having a particle size distribution shown in Table 13 and an average particle size of 1.75 μm.

TABLE 13

| Average Particle Size (μm) | 1.75 |
|---|---|
| Particle Size Distribution (%) | |
| below 1.59 μm | 6 |
| 1.59 to 2.00 μm | 81 |
| above 2.00 μm | 13 |

An emulsion was prepared by dispersing 0.04 g of the resin particles (seed polymer) in a solution comprising 70 g of ethanol, 70 g of deionized water, 12 g of styrene, 0.15 g of polyvinyl alcohol and 0.15 g of 2,2′-azobis(2,4-dimethylvaleronitrile).

When the emulsion was rapidly cooled to −10° C. from room temperature in the same manner as described in Example 1, it was confirmed that the seed polymer particles were swollen to spherical particles having a particle size of about 11.5 μm.

Polymerization of the emulsion was carried out in the same manner as described in Example 11.

The obtained polymer was recovered by filtration and dried to obtain about 10 g of resin particles. The filtrate was slightly opaque. The particle size distribution of the obtained resin particles was measured by a Coulter counter. The obtained results are shown in Table 14. From the results shown in Table 14, it is seen that the polymer had a highly monodisperse particle size distribution and was composed of spherical particles having an average particle size of 11.4 μm.

Furthermore, the particle size distribution of resin particles having an average particle size of 11.6 μm, which were obtained by pulverizing a polystyrene resin by a pulverizer (Model IDS-2 supplied by Nippon Pneumatic), was measured by a Coulter counter. The obtained results are also shown in Table 14.

From the results shown in Table 14, it is seen that the resin particles obtained by the polymerization had a more highly monodisperse particle size distribution than the pulverized product.

TABLE 14

| | Polymerized Product | Pulverized Product |
|---|---|---|
| Average Particle Size (μm) | 11.4 | 11.5 |
| Particle Size Distribution (%) | | |
| below 16.0 μm | 4 | 17.4 |
| 16.0 to 25.4 μm | 83 | 42.6 |
| above 25.4 μm | 13 | 40.2 |

EXAMPLE 14

The emulsion prepared in Example 1 was used in the present example.

Figure 1:
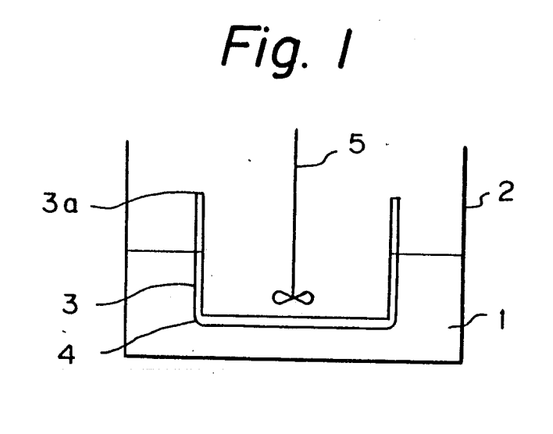
FIGS. 1, 2 and 3 are diagrams illustrating means for decreasing the solubility of a monomer, adopted in Examples 14, 15 and 16 given hereinafter.

As shown in FIG. 1 of the accompanying drawings, a cellulose acetate membrane 4 was arranged on the outer side of a basket-like vessel 3 formed of aluminum and was attached to the upper end portion 3a of the vessel 3 by a vinyl tape. The vessel was gently inserted in a water tank 2 filled with deionized water and a stirrer 5 was arranged. The above-mentioned emulsion was gently injected into the vessel 3 while rotating the stirrer 5 before water was introduced within the cellulose acetate membrane 4. At this point, deionized water 1 in the water tank 2 was intruded into the vessel 3 and the liquid level in the vessel 3 abruptly rose.

When the emulsion in this state was observed by an optical microscope, it was confirmed that the particles were swollen to spherical particles having a particle size of about 8 μm.

The emulsion was charged in a three-neck flask equipped with a reflux condenser and the reaction was carried out at 70° C. for 8 hours in a nitrogen current with stirring at 100 rpm to complete polymerization.

The polymer obtained by the reaction was recovered by filtration and dried to obtain 3 g of resin fine particles. The filtrate was substantially transparent. The particles size distribution of the obtained particles was measured by a Coulter counter. The obtained results are shown in Table 15. As is seen from the results shown in Table 15, the obtained polymer had a highly monodisperse particle size distribution and was composed of spherical particles having an average particle size of 7.7 μm.

TABLE 15

| Average Particle Size (μm) | 7.7 |
|---|---|
| Particle Size Distribution (%) | |
| below 6.3 μm | 1 |
| 6.3 to 8.0 μm | 93 |
| above 8.0 μm | 6 |

EXAMPLE 15

The emulsion prepared in Example 3 was used in the present example.

Figure 2:
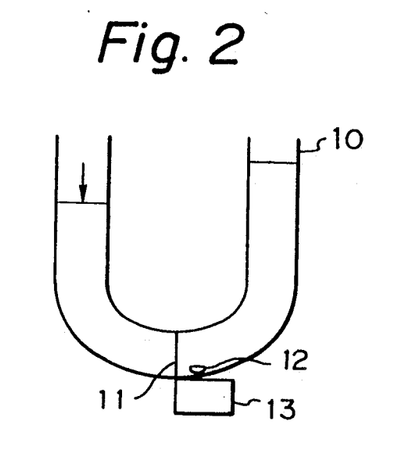

As shown in FIG. 2, a U-figured pipe 10 was partitioned by a cellulose diacetate membrane 11, and deionized water was supplied from one side and the above-mentioned emulsion was simultaneously supplied from the other side. A pressure of 10 g/m² was applied on the side of deionized water, and a stirrer piece 12 was placed on the side of the emulsion and stirred by a magnetic stirrer 13. When rising of the liquid level ceased on the emulsion side, the emulsion was observed by an optical microscope. It was found that the particles were swollen to spherical particles having a particle size of about 14 μm. The emulsion was charged in a three-neck separable flask equipped with a reflux condenser. The reaction was carried out at 70° C. for 8 hours in a nitrogen current with stirring at 100 rpm to complete polymerization. The obtained polymer was recovered by filtration and dried to obtain 16 g of resin particles. The filtrate was substantially transparent. When the particle size distribution of the resin particles was measured by a Coulter counter, results obtained in Table 16 were obtained. As is apparent from the results shown in Table 16, the obtained polymer had a highly monodisperse particle size distribution and was composed of spherical particles having an average particle size of 13.8 μm.

TABLE 16

| Average Particle Size (μm) | 13.8 |
|---|---|
| Particle Size Distribution (%) | |
| below 12.7 μm | 0.5 |
| 12.7 to 16.0 μm | 94.5 |
| above 16.0 μm | 5.0 |

EXAMPLE 16

The emulsion prepared in Example 5 was used in the present example.

Figure 3:
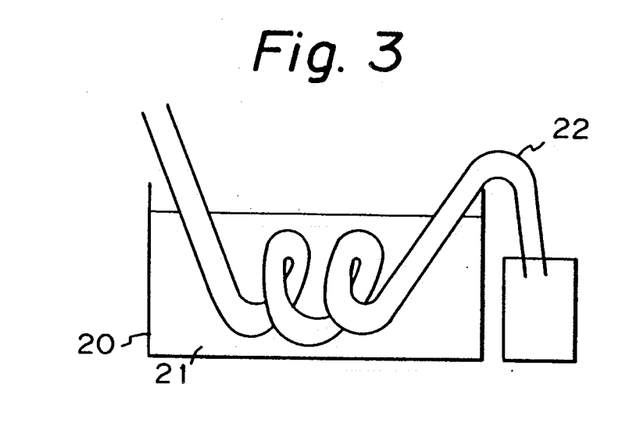

As shown in FIG. 3, deionized water 21 was charged in a water tank 20, and the central portion of a cellophane tube 22 (supplied by Wako Junyaku Kogyo) was immersed in the water tank 20, and the above-mentioned was injected from one end of the tube 22 and the liquid flowing out from the other side was received in a beaker and observed by an optical microscope. It was confirmed that the particles were swollen to spherical particles having a particle size of about 8 μm.

The so-obtained emulsion was charged in a three-neck separable flask equipped with a reflux condenser, and the reaction was carried out at 70° C. for 8 hours in a nitrogen current with stirring at 100 rpm to complete polymerization. The polymer was recovered by filtration and dried to obtain 3 g of resin particles. The filtrate was slightly opaque. The particle size distribution of the obtained resin particles was measured by a Coulter counter. The obtained results are shown in Table 17. As is seen from the results shown in Table 17, the obtained polymer had a highly monodisperse particle size distribution and was composed of spherical particles having an average particle size of 7.4 μm.

TABLE 17

| Average Particle Size (μm) | 7.4 |
|---|---|
| Particle Size Distribution (%) | |
| below 6.3 μm | 2 |
| 6.3 to 8.0 μm | 90 |
| above 8.0 μm | 7 |

As is apparent from the results obtained in the foregoing examples, according to the present invention, by reducing the solubility of a monomer in a water-miscible organic solvent which acts as a solvent for the monomer and as a dispersion medium for seed polymer particles and making the monomer absorbed in the seed polymer particles in an amount corresponding to the decrease of the solubility, the seed polymer particles can be swollen by the monomer in a very short time at a high efficiency. Furthermore, since the monomer absorbed in the seed polymer particles is polymerized at a high selectivity, monodisperse polymer particles having an increased particle size can be applied at low costs to such uses as electrophotographic toners, gap-adjusting agents for liquid crystal display panels, standard particles of a Coulter counter, column fillers for the chromatography or the like, immune diagnosis carriers and cosmetic fillers.

What is claimed is:

1. A process for the preparation of monodisperse polymer particles having an increased particle size, which comprises:
   (i) preparing a solution or dispersion of a monomer, an oil-soluble polymerization initiator and a dispersion stabilizer in a mixture of (a) a water-miscible organic solvent capable of dissolving the monomer therein but incapable of dissolving a polymer of the monomer therein and (b) water;
   (ii) dispersing a seed polymer having a swelling property to the monomer into said solution or dispersion to form an emulsion;
   (iii) reducing the solubility of said monomer in said mixture of water-miscible organic solvent and water thereby causing said monomer and said polymerization initiator to be absorbed in said seed polymer to form swollen spherical particles having an increased particle size; and
   (iv) selectively polymerizing the monomer absorbed in said seed polymer particles.

2. The method according to claim 1, wherein said step (iii) comprises:
   cooling said emulsion rapidly to reduce the solubility of the monomer in said mixture of water-miscible organic solvent and water, and
   diluting said emulsion with water to maintain said swollen spherical particles in the particle size-increased state.

3. The method according to claim 1, wherein said step (iii) comprises:
   evaporating said organic solvent under reduced pressure to reduce the solubility of the monomer in said mixture of water-miscible organic solvent and water.

4. The method according to claim 1, wherein said step (iii) comprises:
   adding an electrolyte to said emulsion to reduce the solubility of the monomer in said mixture of water-miscible organic solvent and water.

5. The method according to claim 1, wherein said step (iii) comprises:
   contacting said emulsion with water through a semipermeable membrane to reduce the solubility of the monomer in said mixture of water-miscible organic solvent and water.

6. The method according to claim 1, wherein said step (iii) comprises:
   adding water to said emulsion to reduce the solubility of the monomer in said mixture of water-miscible organic solvent and water.

7. The method according to claim 1, wherein said monomer is selected from the group consisting of monovinyl aromatic monomers, acrylic monomers, vinyl ester monomers, vinyl ether monomers, diolefin monomers, mono-olefin monomers, halogenated olefin monomers, polyvinyl monomers and mixtures thereof.

8. The process according to claim 1, wherein said water-miscible organic solvent is selected from the group consisting of lower alcohols, polyhydric alcohols, ketones, ethers, and esters.

9. The process according to claim 1, wherein said seed polymer has a monodisperse particle size distribution and a particle size of 0.01 to 50 μm.

10. The process according to claim 9, wherein said seed polymer has a particle size of 0.5 to 20 μm.

11. The process according to claim 1, wherein said dispersion stabilizer is a polymeric dispersion stabilizer selected from the group consisting of polyvinyl alcohol, methyl cellulose, ethyl cellulose polyacrylic acid, polyacrylamide, polyethylene oxide and poly(hydroxystearic acid-methyl-g-methacrylate-comethacrylic acid)-copolymer.

12. The process according to claim 1, wherein said dispersion stabilizer is selected from the group consisting of nonionic surface active agents, anionic surface active agents, cationic surface active agents and amphoteric surface active agents.

13. The process according to claim 1, wherein said polymerization initiator is a radical polymerization initiator.

14. The process according to claim 1, wherein said monomer is present in an amount of 0.01 to 50% by weight.

15. The process according to claim 14, wherein said seed polymer is present in an amount of 0.0001 to 50% by weight.

16. The process according to claim 15, wherein the ratio of seed particles to monomer is in the range of from 1/1 to $1/10^9$.

17. The process according to claim 1, wherein said dispersion stabilizer is present in an amount of 0.1 to 30% by weight based on the seed particles.

18. The process according to claim 1, wherein said polymerization initiator is present in an amount of 0.001 to 10% by weight based on the monomer.

* * * * *